US012456596B2

(12) United States Patent
Yoneda

(10) Patent No.: US 12,456,596 B2
(45) Date of Patent: Oct. 28, 2025

(54) FUSE ELEMENT, FUSE DEVICE AND PROTECTION DEVICE

(71) Applicant: DEXERIALS CORPORATION, Shimotsuke (JP)

(72) Inventor: Yoshihiro Yoneda, Shimotsuke (JP)

(73) Assignee: DEXERIALS CORPORATION, Shimotsuke (JP)

(*) Notice: Subject to any disclaimer, the term of this patent is extended or adjusted under 35 U.S.C. 154(b) by 123 days.

(21) Appl. No.: 18/020,096

(22) PCT Filed: Aug. 17, 2021

(86) PCT No.: PCT/JP2021/029965
§ 371 (c)(1),
(2) Date: Feb. 7, 2023

(87) PCT Pub. No.: WO2022/039136
PCT Pub. Date: Feb. 24, 2022

(65) Prior Publication Data

US 2023/0290601 A1 Sep. 14, 2023

(30) Foreign Application Priority Data

Aug. 19, 2020 (JP) ................................ 2020-138571

(51) Int. Cl.
*H01H 85/06* (2006.01)
*H01H 85/00* (2006.01)

(52) U.S. Cl.
CPC ........ *H01H 85/06* (2013.01); *H01H 85/0047* (2013.01)

(58) Field of Classification Search
CPC .................. H01H 85/0047; H01H 85/055-12
See application file for complete search history.

(56) References Cited

U.S. PATENT DOCUMENTS 6,222,438 B1* 4/2001 Horibe .................. H01H 85/06 337/296
2005/0035841 A1* 2/2005 Kobayashi ......... H01H 85/0418 337/157

(Continued)

FOREIGN PATENT DOCUMENTS

JP 2016071973 A 5/2016
JP 2016095899 A 5/2016

(Continued)

OTHER PUBLICATIONS

Furuuchi translation of JP-2019033093-A.*

(Continued)

*Primary Examiner* — Jacob R Crum
(74) *Attorney, Agent, or Firm* — Element IP, PLC

(57) ABSTRACT

A fuse element includes: a low-melting-point metal layer; a high-melting-point metal layer provided over at least one surface of the low-melting-point metal layer; and an intermediate layer disposed between the low-melting-point metal layer and the high-melting-point metal layer. Each of the high-melting-point metal layer and the intermediate layer is made of a metal that is liquefied by contacting a molten form of the low-melting-point metal layer. The high-melting point metal layer is made of silver or an alloy comprising silver as a main component thereof. A melting point of a material constituting the intermediate layer is higher than a melting point of a material constituting the low-melting-point metal layer and lower than a melting point of a material constituting the high-melting-point metal layer.

15 Claims, 3 Drawing Sheets

(56) References Cited

U.S. PATENT DOCUMENTS

| | | | | |
|---|---|---|---|---|
| 2005/0040926 A1* | 2/2005 | Ely | H01H 85/11 | 337/159 |
| 2011/0057761 A1* | 3/2011 | Wang | H01H 85/0241 | 337/297 |
| 2012/0112871 A1* | 5/2012 | Chen | H01H 85/044 | 337/297 |
| 2013/0234822 A1* | 9/2013 | Aurich | B22D 41/015 | 337/416 |
| 2017/0278663 A1* | 9/2017 | Yoneda | H01H 85/12 | |
| 2018/0025879 A1* | 1/2018 | Ho | H01H 85/06 | 337/187 |

FOREIGN PATENT DOCUMENTS

| | | | |
|---|---|---|---|
| JP | 6249600 B2 | 12/2017 | |
| JP | 6420053 B2 | 11/2018 | |
| JP | 2019033093 A * | 2/2019 | H01H 37/76 |
| KR | 1020150135349 A | 12/2015 | |

OTHER PUBLICATIONS

International Search Report issued Nov. 2, 2021 in PCT/JP2021/029965 (with English translation), 5 pages.
International Preliminary Report on Patentability issued Jul. 20, 2022 in PCT/JP2021/029965 (with English translation), 6 pages.
Written Opinion issued Nov. 2, 2021 in PCT/JP2021/029965 (with partial English translation), 5 pages.
Office Action issued Sep. 3, 2024 in corresponding Japanese Patent Application No. 2020-138571 (with English translation), 10 pages.
Office Action issued Aug. 13, 2024 in corresponding Korean Patent Application No. 10-2023-7004057 (with English translation), 11 pages.
Combined Taiwanese Office Action and Search Report issued Jan. 14, 2025, in corresponding Taiwanese Patent Application No. 110130607 (with machine English translation), 15 pages.

* cited by examiner

FUSE ELEMENT, FUSE DEVICE AND PROTECTION DEVICE

TECHNICAL FIELD

The present invention relates to a fuse element and to a fuse device and protection device using this fuse element.

Priority of the present application is claimed based on Japanese Patent Application No. 2020-138571 filed in Japan on Aug. 19, 2020, the contents of which are incorporated herein by reference in their entirety.

BACKGROUND TECHNOLOGY

As a current breaking device for breaking a current path when a circuit board is energized by an overcurrent exceeding a rating, a fuse device is known that breaks the current path by a fuse element per se being heated and cut. For example, Patent Document 1 teaches, as a fuse element for a fuse device, a fuse element having a low-melting-point metal layer and a high-melting-point metal layer stacked on the low-melting-point metal layer. A configuration is such that when energized by a current exceeding a rating, the low-melting-point metal layer melts, and this melted substance liquefies the high-melting-point metal layer, thereby cutting the fuse element. This Patent Document 1 illustrates solder, tin, and a tin alloy as a material of the low-melting-point metal layer and illustrates silver, copper, and an alloy whose main component is silver or copper as a material of the high-melting-point metal layer.

Furthermore, as a current breaking device for breaking a current path when an abnormality other than an overcurrent arises in a circuit board, a protection device using a heating body (heater) is known. This protection device is configured to conduct a current through the heating body at a time of an abnormality other than an overcurrent. This causes the heating body to generate heat, and this heat is used to cut a fuse element. For example, Patent Document 2 teaches, as a fuse element (meltable conductor) for a protection device using a heating body, a fuse element made of a stacked body including a high-melting-point metal layer and a low-melting-point metal layer. A configuration is such that the low-melting-point metal layer is melted by heat emitted by the heating body and liquefies the high-melting-point metal layer, and this cuts the fuse element. This Patent Document 2 illustrates Pb free solder, tin, and a tin alloy as a material of the low-melting-point metal layer and illustrates silver, copper, and an alloy whose main component is silver or copper as a material of the high-melting-point metal layer.

CITATION LIST

Patent Documents

Patent Document 1: Japanese Patent No. 6420053
Patent Document 2: Japanese Patent No. 6249600

SUMMARY OF INVENTION

Problem to be Solved by Invention

A fuse element is preferably cut by a low-melting-point metal layer melting quickly at a time of an abnormality such as an overcurrent and this melted substance liquefying a high-melting-point metal layer. However, when copper or a copper alloy is used as a material of the high-melting-point metal layer, because copper has a high melting point compared to silver and easily forms an oxide film due to its high tendency to ionize, liquefaction of the high-melting-point metal layer by a molten form of the low-melting-point metal layer is hindered, and a fuse-element cutting speed tends to decrease. Meanwhile, when silver or a silver alloy is used as a material of the high-melting-point metal layer, liquefaction of the high-melting-point metal layer by the molten form of the low-melting-point metal layer is accelerated, but this increases material costs. Reducing a thickness of the high-melting-point metal layer to decrease material costs risks decreasing a strength of the fuse element. In particular, there is a risk of the strength of the fuse element decreasing when the low-melting-point metal layer is softened due to, for example, heating at a time of reflowing performed when producing a fuse device or a protection device.

The present invention is made in view of these circumstances and has as an object to provide a fuse element that can be cut quickly at a time of an abnormality such as an overcurrent and has low production costs and to provide a fuse device and protection device using this fuse element.

Means to Solve the Problem

The present invention provides the following means in order to achieve this object.

(1) A fuse element of one embodiment of the present invention has: a low-melting-point metal layer; a high-melting-point metal layer stacked on at least one surface of the low-melting-point metal layer; and an intermediate layer disposed between the low-melting-point metal layer and the high-melting-point metal layer; wherein the high-melting-point metal layer and the intermediate layer are layers made of a metal that is liquefied by a molten form of the low-melting-point metal layer, and a melting point of a material constituting the intermediate layer is higher than a melting point of a material constituting the low-melting-point metal layer and lower than a melting point of a material constituting the high-melting-point metal layer.

(2) In the embodiment described in (1) above, a configuration may be such that the melting point of the material constituting the low-melting-point metal layer is in a range of 138° C. or higher and 250° C. or lower, the melting point of the material constituting the high-melting-point metal layer is higher by 200° C. or more than the melting point of the material constituting the low-melting-point metal layer, and the melting point of the material constituting the intermediate layer is higher by 30° C. or more than the melting point of the material constituting the low-melting-point metal layer and lower by 30° C. or more than the melting point of the material constituting the high-melting-point metal layer.

(3) In the embodiment described in (1) or (2) above, a configuration may be such that the melting point of the material constituting the low-melting-point metal layer, the melting point of the material constituting the high-melting-point metal layer, and the melting point of the material constituting the intermediate layer are liquidus temperatures of the respective materials.

(4) In the embodiment described in any one among (1) to (3) above, a configuration may be such that a film thickness ratio between the intermediate layer and the high-melting-point metal layer is in a range of 10:1 to 1:30, and a film thickness ratio between a total film thickness of the high-melting-point metal layer and the intermediate layer, and a film thickness of the low-melting-point metal layer is in a range of 1:2 to 1:100.

(5) In the embodiment described in any one among (1) to (4) above, a configuration may be such that a film thickness of the low-melting-point metal layer is 30 μm or more, a film thickness of the high-melting-point metal layer is in a range of 1 μm or more and 200 μm or less, and a film thickness of the intermediate layer is in a range of 0.1 μm or more and 50 μm or less.

(6) In the embodiment described in any one among (1) to (5) above, a configuration may be such that the low-melting-point metal layer is a layer made of tin or a tin alloy whose main component is tin.

(7) In the embodiment described in any one among (1) to (6) above, a configuration may be such that the intermediate layer is a layer made of at least one type of metal selected from a group consisting of bismuth, zinc, antimony, aluminum, silver, gold, copper, nickel, and cobalt or an alloy whose main component is this metal.

(8) In the embodiment described in any one among (1) to (7) above, a configuration may be such that the high-melting-point metal layer is a layer made of at least one type of metal selected from a group consisting of zinc, antimony, aluminum, silver, gold, copper, nickel, cobalt, and iron or an alloy whose main component is this metal.

A fuse device of one embodiment of the present invention is provided with: an insulating substrate; and the fuse element of any one among (1) to (8) above disposed on a surface of the insulating substrate.

A protection device of one embodiment of the present invention is provided with: an insulating substrate; the fuse element of any one among (1) to (8) above disposed on a surface of the insulating substrate; and a heating body that is disposed on a surface of the insulating substrate and heats the fuse element.

Effect of the Invention

The present invention can provide a fuse element that can be cut quickly at a time of an abnormality such as an overcurrent and has low production costs and provide a fuse device and protection device using this fuse element.

DESCRIPTION OF THE EMBODIMENTS

Preferred examples of embodiments of a fuse element of the present invention and a fuse device and protection device using this fuse element are described in detail below with reference to the drawings as appropriate. The drawings used in the following description may provide enlarged illustrations of characteristic portions for convenience in facilitating understanding of characteristic features. Dimensional ratios and the like of each component may differ from actual ratios and the like. Materials, dimensions, and the like illustrated in the following description are examples. The present invention is not limited thereto and can be implemented with appropriate modifications in a scope wherein the effects of the present invention are exhibited. Positions, quantities, ratios, types, sizes, shapes, and the like can be modified, omitted, added, substituted, and otherwise modified in a scope that does not depart from the spirit of the present invention. Preferred characteristic features and conditions from each example may be shared between examples as long as this causes no problems in particular.

[Fuse Element (First Embodiment)]

Figure 1:
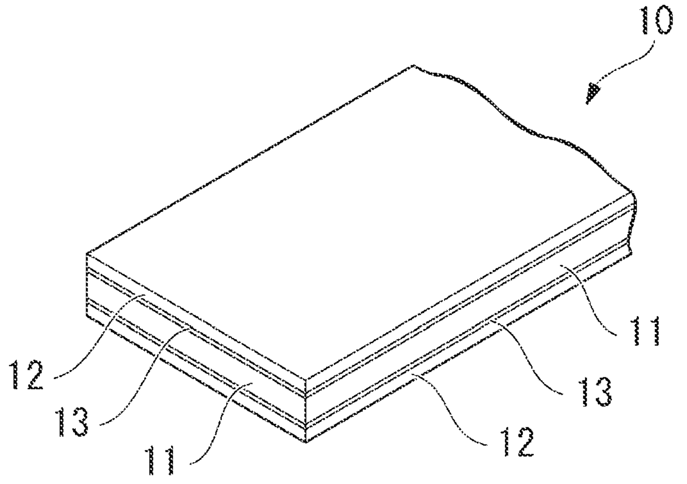
FIG. 1 A schematic perspective view illustrating one example of a fuse element of a first embodiment of the present invention.

FIG. 1 is a schematic perspective view of a fuse element of a first embodiment of the present invention.

As illustrated in FIG. 1, a fuse element 10 has a low-melting-point metal layer 11, a high-melting-point metal layer 12 stacked on a surface of the low-melting-point metal layer 11, and an intermediate layer 13 disposed between the low-melting-point metal layer 11 and the high-melting-point metal layer 12. Any plan-view shape and sectional shape can be selected for the fuse element 10.

A melting point of the low-melting-point metal layer 11 is preferably no higher than a heating temperature at a time of reflowing performed when producing a fuse device or a protection device. When the reflow temperature is 240° C. to 260° C., a melting point TL of a material constituting the low-melting-point metal layer 11 is preferably in a range of 138° C. or higher and 250° C. or lower. As necessary, the melting point TL may be in a range of 138° C. or higher and 218° C. or lower or a range of 218° C. or higher and 250° C. or lower. Note that the melting point of the material constituting the low-melting-point metal layer 11 may be a liquidus temperature of this material. That is, when the material constituting the low-melting-point metal layer 11 is an alloy, the melting point may be a temperature on a liquidus of a predetermined composition in an equilibrium diagram of the alloy.

The material of the low-melting-point metal layer 11 is preferably tin or a tin alloy including tin as a main component. Being included as a main component in the tin alloy is preferably defined as a tin content of the tin alloy being 40% or more by mass—more preferably 60% or more by mass. The tin content may also be 70% or more by mass or 80% or more by mass. Any upper limit can be selected for the tin content. For example, this may be 99% or less by mass or 97% or less by mass. As an example of the tin alloy, an Sn—Bi alloy, an In—Sn alloy, and an Sn—Ag—Cu alloy can be mentioned.

The high-melting-point metal layer 12 is a layer made of a metal material that is liquefied by a molten form of the low-melting-point metal layer 11. When the material of the low-melting-point metal layer 11 is tin or a tin alloy, the material of the high-melting-point metal layer 12 is preferably at least one type of metal selected from a group consisting of zinc, antimony, aluminum, silver, gold, copper, nickel, cobalt, and iron or an alloy whose main component is this metal. Being included as a main component in this alloy is preferably defined as a content of this metal in the alloy being 40% or more by mass—more preferably 60% or more by mass. The content of the metal may also be 70% or more by mass or 80% or more by mass. Any upper limit can be selected for the content of the metal. For example, this may be 99% or less by mass or 97% or less by mass. As an example of the alloy, phosphor bronze, a silver-palladium alloy, a nickel-iron alloy, and a nickel-cobalt alloy can be mentioned. The material of the high-melting-point metal layer 12 is preferably one among copper, a copper alloy, silver, and a silver alloy from a standpoint of increasing an electrical conductivity of the fuse element 10 in a normal period.

A melting point TH of the material constituting the high-melting-point metal layer 12 is preferably higher by 100° C. or more than the melting point TL of the material constituting the low-melting-point metal layer 11. That is, the melting point of the high-melting-point metal layer 12 is preferably higher by 100° C. or more than the low-melting-point metal layer 11. A difference between the melting point TH and the melting point TL (melting point TH−melting point TL) is more preferably 500° C. or more and particularly preferably 800° C. or more. The difference between the melting point TH and the melting point TL may be 1,500° C. or less. Moreover, the melting point TH is preferably in a range of 400° C. or higher and 1,700° C. or lower. As necessary, the melting point TH may be in a range of 400° C. or higher and 600° C. or lower, a range of 600° C. or higher and 1,000° C. or lower, or a range of 1,000° C. or higher and 1,600° C. or lower. Note that the melting point of the material constituting the high-melting-point metal layer 12 may be a liquidus temperature of this material. That is, when the material constituting the high-melting-point metal layer 12 is an alloy, the melting point may be a temperature on a liquidus of a predetermined composition in an equilibrium diagram of the alloy.

The intermediate layer 13 is a layer made of a metal material that is liquefied by the molten form of the low-melting-point metal layer 11. When the material of the low-melting-point metal layer 11 is tin or a tin alloy, the material of the intermediate layer 13 is preferably at least one type of metal selected from a group consisting of tin, bismuth, zinc, antimony, aluminum, silver, gold, copper, nickel, and cobalt or an alloy whose main component is this metal. Being included as a main component in this alloy is preferably defined as a content of this metal in the alloy being 40% or more by mass—more preferably 60% or more by mass. The content of the metal may also be 70% or more by mass or 80% or more by mass. Any upper limit can be selected for the content of the metal. For example, this may be 99% or less by mass or 97% or less by mass. For example, when the material of the low-melting-point metal layer 11 is a tin alloy such as an Sn—Bi alloy or an In—Sn alloy, the material of the intermediate layer 13 may be tin or a tin alloy such as an Sn—Ag—Cu alloy, an Sn—Ag alloy, or an Sn—Cu alloy.

A melting point TM of the material constituting the intermediate layer 13 is preferably higher by 30° C. or more than the melting point TL of the material constituting the low-melting-point metal layer 11 and lower by 30° C. or more than the melting point TH of the material constituting the high-melting-point metal layer 12. That is, the melting point of the intermediate layer 13 is preferably higher by 30° C. or more than the low-melting-point metal layer 11 and lower by 30° C. or more than the high-melting-point metal layer 12. A difference between the melting point TM and the melting point TL (melting point TM−melting point TL) is more preferably 150° C. or more and particularly preferably 500° C. or more. The difference between the melting point TM and the melting point TL may be 1,300° C. or less. A difference between the melting point TM and the melting point TH (melting point TH−melting point TM) is more preferably 100° C. or more and particularly preferably 200° C. or more. The difference between the melting point TM and the melting point TH may be 800° C. or less or 600° C. or less. Moreover, the melting point TM is preferably in a range of 260° C. or higher and 1,500° C. or lower. As necessary, the melting point TM may be in a range of 260° C. or higher and 600° C. or lower, a range of 600° C. or higher and 1,000° C. or lower, or a range of 1,000° C. or higher and 1,500° C. or lower. Note that the melting point of the material constituting the intermediate layer 13 may be a liquidus temperature of this material. That is, when the material constituting the intermediate layer 13 is an alloy, the melting point may be a temperature on a liquidus of a predetermined composition in an equilibrium diagram of the alloy.

The material of the high-melting-point metal layer 12 and the material of the intermediate layer 13 are preferably a combination that produces an alloy. For example, when the material of the high-melting-point metal layer 12 is copper or a copper alloy, the material of the intermediate layer 13 is preferably silver, a silver alloy, zinc, or a zinc alloy. Moreover, when the material of the high-melting-point metal layer 12 is silver or a silver alloy, the material of the intermediate layer 13 is preferably zinc or a zinc alloy.

The fuse element 10 is cut by the low-melting-point metal layer 11 melting at a time of an abnormality such as an overcurrent and the melted substance that is produced liquefying the intermediate layer 13 and the high-melting-point metal layer 12. In the fuse element 10, the low-melting-point metal layer 11 is included at an amount necessary to cut the fuse element 10 by liquefying the intermediate layer 13 and the high-melting-point metal layer 12. The intermediate layer 13 and the high-melting-point metal layer 12 are included at an amount necessary to maintain the shape of the fuse element 10 at a time of reflowing performed when producing a fuse device or a protection device and at an amount enabling the aforementioned melted substance to perform liquefaction quickly at a time of an abnormality.

From the above standpoint, any film thickness can be selected for the low-melting-point metal layer 11, but 30 μm or more is preferable. The film thickness of the low-melting-point metal layer 11 may also be 60 μm or more, 100 μm or more, or 500 μm or more. Any upper limit can be selected for the film thickness of the low-melting-point metal layer 11. For example, this may be 3,000 μm or lower. As necessary, this may also be 2,000 μm or lower, 1,500 μm or lower, or the like.

Furthermore, any film thickness can be selected for the high-melting-point metal layer 12, but this is preferably in a range of 1 μm or more and 200 μm or less. As necessary, this may be in a range of 1 μm or more and 60 μm or less, a range of 60 μm or more and 150 μm or less, or a range of 150 μm or more and 200 μm or less.

Furthermore, any film thickness can be selected for the intermediate layer 13, but this is preferably in a range of 0.1 μm or more and 50 μm or less. As necessary, this may be in a range of 0.1 μm or more and 10 μm or less, a range of 10 μm or more and 20 μm or less, or a range of 1 μm or more and 30 μm or less.

Furthermore, any film thickness ratio between the high-melting-point metal layer 12 and the intermediate layer 13 (film thickness of former:film thickness of latter) can be selected, but this is preferably in a range of 30:1 to 1:10. As necessary, this may be, for example, in a range of 30:1 to 1:1, a range of 30:1 to 10:1, a range of 10:1 to 5:1, or a range of 1:1 to 1:10. When the material constituting the intermediate layer 13 is highly soluble in the molten form of the low-melting-point metal layer 11, the film thickness of the intermediate layer 13 may be made equal to or greater than the film thickness of the high-melting-point metal layer 12. For example, when the material of the low-melting-point metal layer 11 is tin or a tin alloy and the material of the intermediate layer 13 is tin, silver, copper, or an alloy whose main component is such a metal, the film thickness ratio between the high-melting-point metal layer 12 and the intermediate layer 13 may be in the range of 1:1 to 1:10. Moreover, when the material constituting the intermediate layer 13 has low solubility in the molten form of the low-melting-point metal layer 11, the film thickness of the intermediate layer 13 may be made equal to or less than the film thickness of the high-melting-point metal layer 12. For example, when the material of the low-melting-point metal layer 11 is tin or a tin alloy and the material of the intermediate layer 13 is bismuth, zinc, antimony, aluminum, gold, nickel, cobalt, or an alloy whose main component is such a metal, the film thickness ratio between the high-melting-point metal layer 12 and the intermediate layer 13 may be in the range of 30:1 to 1:1. Adjusting the film thickness ratio between the high-melting-point metal layer 12 and the intermediate layer 13 enables adjustment of a strength of the fuse element 10, a cutting speed of the fuse element 10 at a time of abnormality such as an overcurrent, and production costs.

Furthermore, any film thickness ratio between a total film thickness of the high-melting-point metal layer 12 and the intermediate layer 13, and the film thickness of the low-melting-point metal layer 11 (film thickness of former:film thickness of latter) can be selected, but this is preferably in a range of 1:2 to 1:100. As necessary, this may be, for example, in a range of 1:2 to 1:10, a range of 1:10 to 1:30, or a range of 1:30 to 1:100. When the total film thickness of the high-melting-point metal layer 12 and the intermediate layer 13 is too thick, a time until the intermediate layer 13 and the high-melting-point metal layer 12 are liquefied at a time of an abnormality becomes long, which may decrease the cutting speed of the fuse element 10. Meanwhile, when the film thickness of the low-melting-point metal layer 11 is too thick, the shape of the fuse element 10 may become difficult to maintain at a time of reflowing to produce a fuse device or a protection device.

The fuse element 10 can be produced by using a film-forming method such as plating, sputtering, or deposition. Specifically, the fuse element 10 can be produced by preparing a metal foil to become the low-melting-point metal layer 11, forming the intermediate layer 13 on a surface of this metal foil by using the film-forming method, and then forming the high-melting-point metal layer 12 on a surface of the intermediate layer 13 by using the film-forming method. When tin or a tin alloy is used as the low-melting-point metal layer 11, the low-melting-point metal layer 11 oxidizes easily, and a passive film may be formed on the surface. In this situation, when forming the intermediate layer 13, it is preferable to use a method of electroplating in a short time by imparting a high current (strike plating). Moreover, the fuse element 10 can be produced by, for example, stacking metal foils. Specifically, the fuse element 10 can be produced by preparing a metal foil to become the low-melting-point metal layer 11, a metal foil to become the intermediate layer 13, and a metal foil to become the high-melting-point metal layer 12 and pressure-bonding these metal foils.

Figure 2:
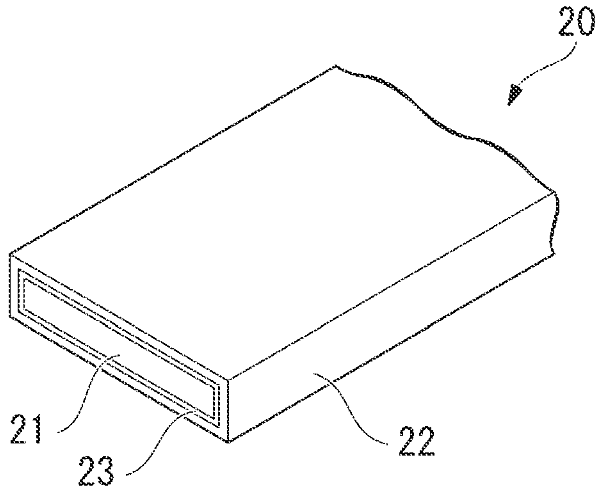
FIG. 2 A schematic perspective view illustrating another example of the fuse element of the first embodiment of the present invention.
Figure 3:
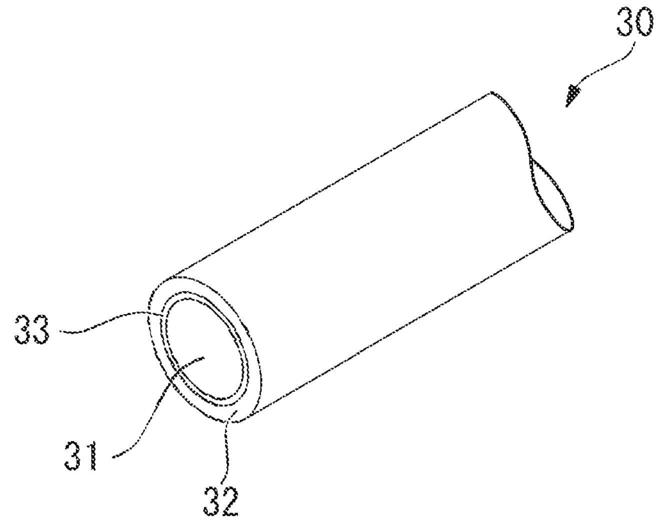
FIG. 3 A schematic perspective view illustrating yet another example of the fuse element of the first embodiment of the present invention.

The fuse element 10 illustrated in FIG. 1 is configured so the intermediate layer 13 and the high-melting-point metal layer 12 are stacked on the surface of the low-melting-point metal layer 11. However, the fuse element is not limited to this configuration. FIG. 2 and FIG. 3 illustrate examples of other configurations of the fuse element 10.

FIG. 2 is a schematic perspective view illustrating another example of the fuse element of the first embodiment of the present invention. The fuse element 20 illustrated in FIG. 2 is made of a low-melting-point metal layer 21 whose cross section is rectangular, a high-melting-point metal layer 22 that is stacked surrounding the low-melting-point metal layer 21, and an intermediate layer 23 disposed between the low-melting-point metal layer 21 and the high-melting-point metal layer 22. In the fuse element 20, main faces and lateral faces of the low-melting-point metal layer 21 are covered by the intermediate layer 23 and the high-melting-point metal layer 22. As such, a rigidity of an outer shell made of the high-melting-point metal layer 22 and the intermediate layer 23 increases, making it easy to maintain the shape of the fuse element 10 at a time of reflowing.

FIG. 3 is a schematic perspective view illustrating yet another example of the fuse element of the first embodiment of the present invention. The fuse element 30 illustrated in FIG. 3 is made of a low-melting-point metal layer 31 whose cross section is circular, a high-melting-point metal layer 32 that is stacked surrounding the low-melting-point metal layer 31, and an intermediate layer 33 disposed between the low-melting-point metal layer 31 and the high-melting-point metal layer 32. In the fuse element 30, the lateral face of the low-melting-point metal layer 31 is covered concentrically by the intermediate layer 33 and the high-melting-point metal layer 32, making the low-melting-point metal layer 31 less likely to oxidize. Moreover, thicknesses of the intermediate layer 33 and the high-melting-point metal layer 32 are easily made uniform, making uniform liquefaction of the intermediate layer 33 and the high-melting-point metal layer 32 more likely. This further increases a cutting speed of the fuse element 30.

The fuse elements 10, 20, 30 of the first embodiment of the present invention configured as above dispose the intermediate layer 33, whose melting point is higher than the low-melting-point metal layer 31 and lower than the high-melting-point metal layer 32, between the low-melting-point metal layer 31 and the high-melting-point metal layer 32. As such, strength can be maintained even if the thickness of the high-melting-point metal layer 32 is decreased. Decreasing the thickness of the high-melting-point metal layer 32 enables quick cutting at a time of an abnormality such as an overcurrent.

Moreover, decreasing a thickness of a high-melting-point metal layer 32 that is expensive can lower production costs.

The fuse elements 10, 20, 30 of the first embodiment of the present invention may further have, between the intermediate layers 13, 23, 33 and the metal layers 12, 22, 32 of a high melting point, a layer made of a metal that has a melting point higher than the intermediate layers 13, 23, 33, has a melting point lower than the metal layers 12, 22, 32 of a high melting point, and is liquefied by a molten form of the metal layers 11, 21, 31 of a low melting point. Moreover, an oxidation prevention layer may be provided on a surface of the metal layers 12, 22, 32 of a high melting point.

Next, embodiments of a fuse device and protection device of the present invention are described using an example wherein the fuse element 10 illustrated in FIG. 1 is used as a fuse element.

[Fuse Device (Second Embodiment)]

Figure 4:
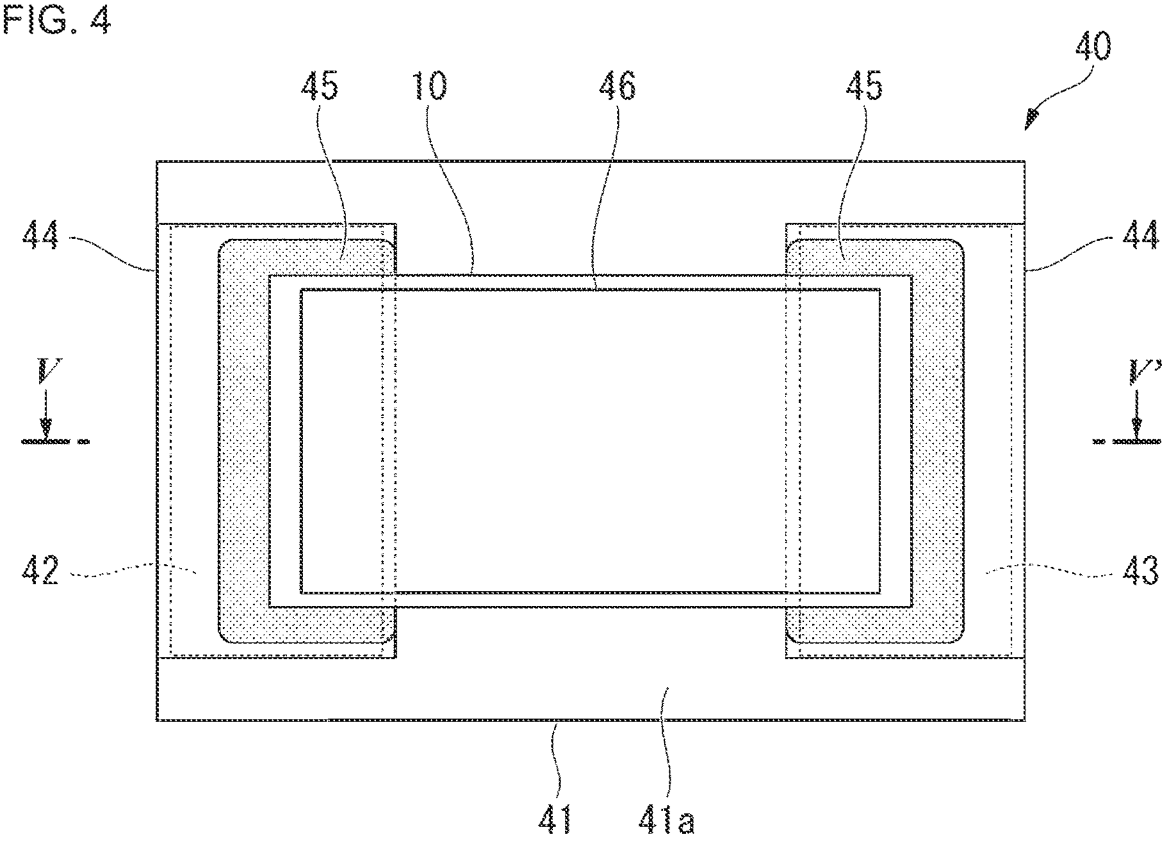
FIG. 4 A schematic plan view illustrating an example of a fuse device of a second embodiment of the present invention.
Figure 5:
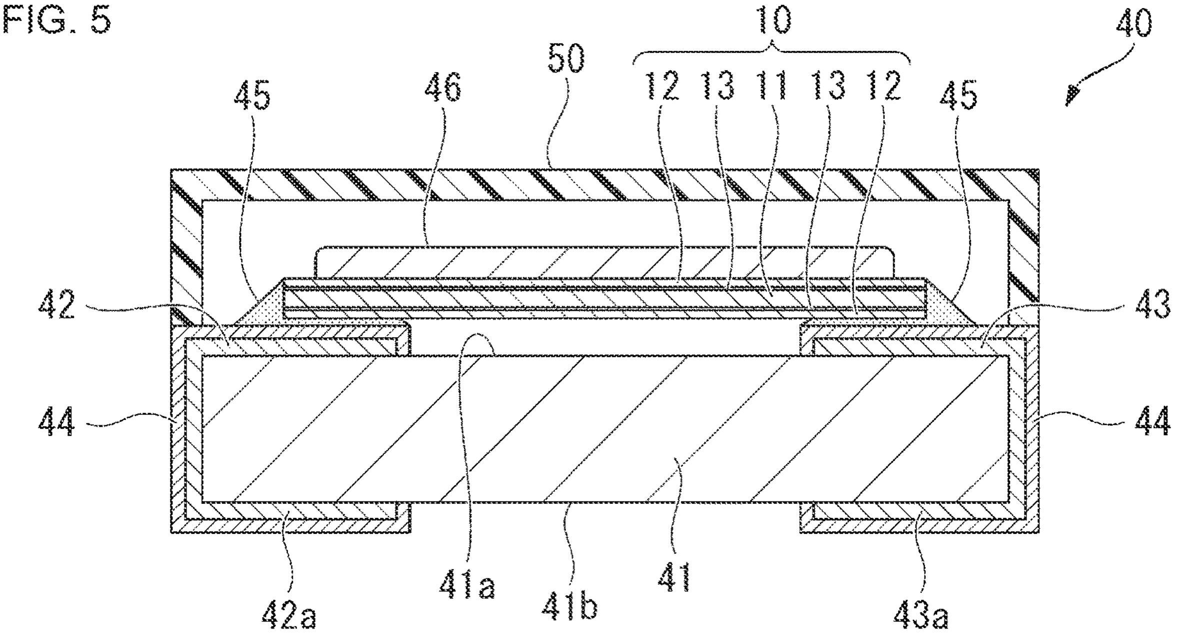
FIG. 5 A sectional view at line V-V' in FIG. 4.

FIG. 4 is a schematic plan view of a fuse device of a second embodiment of the present invention. FIG. 5 is a sectional view at line V-V' in FIG. 4. Note that FIG. 4 illustrates a state wherein a cover member of the fuse device is removed.

As illustrated in FIG. 4 and FIG. 5, a fuse device 40 is provided with an insulating substrate 41, a first electrode 42 and second electrode 43 disposed on a surface 41*a* of the insulating substrate 41, and the fuse element 10, which electrically connects the first electrode 42 and the second electrode 43.

The insulating substrate 41 is not particularly limited as long as it is electrically insulating, and a known insulating substrate used as a circuit board—such as a resin substrate, a ceramic substrate, or a composite substrate of resin and ceramic—can be used. As an example of the resin substrate, an epoxy resin substrate, a phenol resin substrate, and a polyimide substrate can be mentioned. As an example of the ceramic substrate, an alumina substrate, a glass-ceramic substrate, a mullite substrate, and a zirconia substrate can be mentioned. As an example of the composite substrate, a glass-epoxy substrate can be mentioned.

The first electrode 42 and the second electrode 43 are disposed in a pair of opposing end portions of the insulating substrate 41. The first electrode 42 and the second electrode 43 are each formed by a conductive pattern of silver wiring, copper wiring, or the like. Respective surfaces of the first electrode 42 and the second electrode 43 are covered by an electrode protection layer 44 for suppressing alteration of electrode characteristics due to oxidation or the like. As a material of the electrode protection layer 44, for example, an Sn plating film, an Ni/Au plating film, an Ni/Pd plating film, or an Ni/Pd/Au plating film can be used. Moreover, the first electrode 42 and the second electrode 43 are respectively electrically connected via castellation to a first external connection electrode 42*a* and second external connection electrode 43*a* formed on a rear face 41*b* of the insulating substrate 41. The connection between the first electrode 42 and second electrode 43 and the first external connection electrode 42*a* and second external connection electrode 43*a* is not limited to castellation and may use through holes.

The fuse element 10 is electrically connected to the first electrode 42 and the second electrode 43 via a connecting material 45 such as solder.

The fuse element 10 may have flux 46 coated on a surface thereof. Coating the flux 46 prevents oxidation of the fuse element 10 and improves a wettability of the connecting material 45 when connecting the fuse element 10 and the first electrode 42 and second electrode 43 via the connecting material 45. Moreover, coating the flux 46 can suppress adhesion of melted metal to the insulating substrate 41 due to an arc discharge and improve insulation after cutting of the fuse element 10.

As illustrated in FIG. 5, the fuse device 40 preferably has a cover member 50 attached thereto via an adhesive. Attaching the cover member 50 can protect internal components of the fuse device 40 and prevent scattering of a melted substance that arises when the fuse element 10 is cut. As a material of the cover member 50, various engineering plastics and ceramics can be used.

The fuse device 40 is mounted on a current path of a circuit board via the first external connection electrode 42*a* and the second external connection electrode 43*a*. When a rated current is flowing on the current path of the circuit board, the low-melting-point metal layer 11 of the fuse element 10 provided in the fuse device 40 does not melt. Meanwhile, when the current path of the circuit board is energized by an overcurrent exceeding the rating, the low-melting-point metal layer 11 of the fuse element 10 is heated and melted. The melted substance produced in this manner liquefies the intermediate layer 13 and the high-melting-point metal layer 12, thereby cutting the fuse element 10. Then, the fuse element 10 being cut cuts off the connection between the first electrode 42 and the second electrode 43, breaking the current path of the circuit board.

The fuse device 40 of the second embodiment of the present invention configured as above uses the fuse element 10 of the first embodiment of the present invention. As such, the fuse element 10 is cut quickly at a time of an overcurrent. As such, the current path of the circuit board can be broken at an early stage.

[Protection Device (Third Embodiment)]

Figure 6:
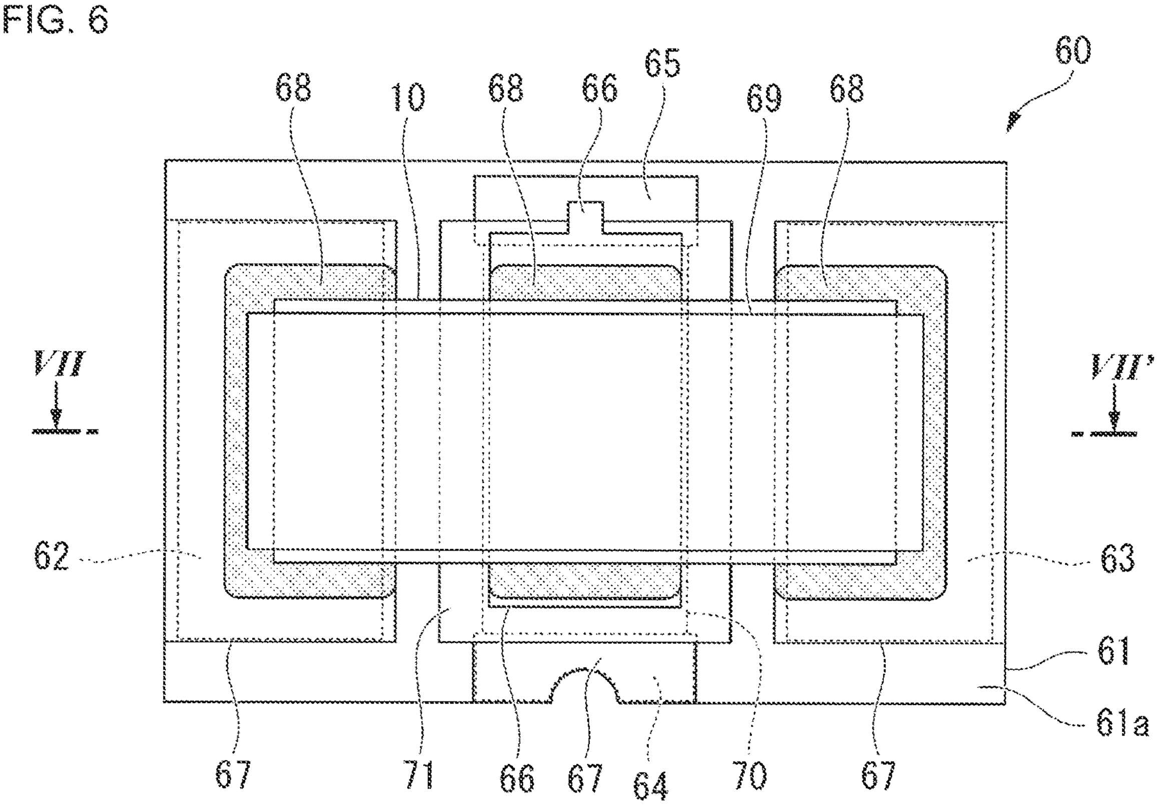
FIG. 6 A schematic plan view illustrating an example of a protection device of a third embodiment of the present invention.
Figure 7:
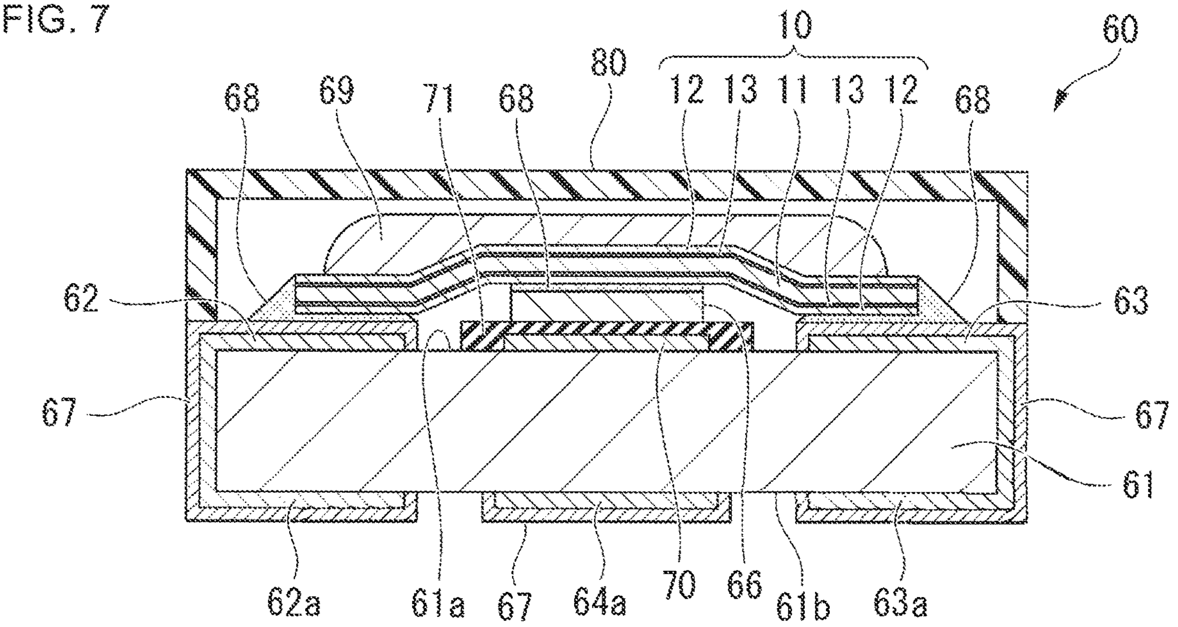
FIG. 7 A sectional view at line VII-VII' in FIG. 6.

FIG. 6 is a schematic plan view of a protection device of a third embodiment of the present invention. FIG. 7 is a sectional view at line VII-VII' in FIG. 6. Note that FIG. 6 illustrates a state wherein a cover member of the protection device is removed. As illustrated in FIG. 6 and FIG. 7, a protection device 60 is provided with an insulating substrate 61, a first electrode 62 and second electrode 63 disposed on a surface 61*a* of the insulating substrate 61, a heating body 70 disposed between the first electrode 62 and the second electrode 63, a first heating-body electrode 64 and second heating-body electrode 65 connected to the heating body 70, a heating-body extraction electrode 66 that is connected to the second heating-body electrode 65 and positioned in a location overlapping the heating body 70 in a plan view, and the fuse element 10, which is disposed on a surface of the heating-body extraction electrode 66.

The insulating substrate 61 is not particularly limited as long as it is electrically insulating. Like the fuse device 40 of the second embodiment, a known insulating substrate used as a circuit board can be used as the insulating substrate 61. In the present example, the insulating substrate 61 is rectangular in a plan view. However, the insulating substrate is not limited to this shape alone, and any shape may be selected.

The first electrode 62 and the second electrode 63 are disposed in a pair of opposing end portions of the insulating substrate 61. The first heating-body electrode 64 and the second heating-body electrode 65 are disposed in another pair of opposing end portions of the insulating substrate 61. The first electrode 62, the second electrode 63, the first heating-body electrode 64, the second heating-body electrode 65, and the heating-body extraction electrode 66 are each formed by a conductive pattern of silver wiring, copper wiring, or the like. Moreover, the first electrode 62, the second electrode 63, the first heating-body electrode 64, the second heating-body electrode 65, and the heating-body extraction electrode 66 are each preferably covered by an electrode protection layer 67 for suppressing alteration of electrode characteristics due to oxidation or the like. A material of the electrode protection layer 67 is similar to that of the fuse device 40 of the second embodiment.

Moreover, the first electrode 62, the second electrode 63, and the first heating-body electrode 64 are respectively electrically connected via castellation to a first external connection electrode 62*a*, second external connection electrode 63*a*, and heating-body power supply electrode 64*a* formed on a rear face 61*b* of the insulating substrate 61. Note that the respective connections between the first electrode 62, second electrode 63, and first heating-body electrode 64 and the first external connection electrode 62*a*, second external connection electrode 63*a*, and heating-body power supply electrode 64*a* are not limited to castellation and may use through holes.

The heating body 70 is made from an electrically conductive material having high resistance that has a relatively high resistance and generates heat by being energized. The heating body 70 is made from, for example, nichrome, W, Mo, or Ru. Alternatively, it is made from a material including such. The heating body 70 can be preferably formed by, for example, a method of mixing a powder of an alloy, composition, or compound including the aforementioned element with a resin binder or the like to prepare a paste, using this paste to form a pattern on the surface of the insulating substrate 61 using screen printing technology, and firing this.

The heating body 70 is covered by an insulating member 71. As a material of the insulating member 71, for example, glass can be used. The heating-body extraction electrode 66 is disposed opposing the heating body 70 via the insulating member 71. This disposition causes the heating body 70 and the fuse element 10 to be superimposed via the insulating member 71 and the heating-body extraction electrode 66. This superimposed structure enables the heat generated by the heating body 70 to be transferred to the fuse element 10 efficiently in a narrow range.

The fuse element 10 has both ends thereof respectively electrically connected to the first electrode 62 and the second electrode 63, and a central portion thereof connected to the heating-body extraction electrode 66. The fuse element 10, the first electrode 62, the second electrode 63, and the heating-body extraction electrode 66 are electrically connected via a connecting material 68 such as solder. This configuration forms in the protection device 60 a first conduction path connecting the heating-body power supply electrode 64*a*, the first heating-body electrode 64, the heating body 70, the second heating-body electrode 65, the heating-body extraction electrode 66, and the fuse element 10 and a second conduction path connecting the first external connection electrode 62*a*, the first electrode 62, the fuse element 10, the second electrode 63, and the second external connection electrode 63*a*. Moreover, flux 69 is coated on the surface of the fuse element 10.

As illustrated in FIG. 7, the protection device 60 preferably has a cover member 80 attached thereto via an adhesive. A material of the cover member 80 is similar to that of the fuse device 40 of the second embodiment.

The protection device 60 is mounted on a current path of a circuit board via the first external connection electrode 62*a*, the second external connection electrode 63*a*, and the heating-body power supply electrode 64*a*. This connects the fuse element 10 of the protection device 60 in series to the current path of the external circuit board via the first external connection electrode 62*a* and the second external connection electrode 63*a*. The heating body 70 is connected via the heating-body power supply electrode 64*a* to a current control device provided on the circuit board.

In the protection device 60, when an abnormality arises in the circuit board, the current control device provided on the circuit board energizes the heating body 70 via the heating-body power supply electrode 64*a*. This energization causes the heating body 70 to generate heat. Then, this heat is transferred to the fuse element 10 via the insulating member 71 and the heating-body extraction electrode 66. This heat melts the low-melting-point metal layer 11 of the fuse element 10, and the generated melted substance liquefies the intermediate layer 13 and the high-melting-point metal layer 12. This results in cutting the fuse element 10. Then, the fuse element 10 being cut cuts off the connection between the first electrode 62 and the second electrode 63, breaking the current path of the circuit board.

The protection device 60 of the third embodiment of the present invention configured as above uses the fuse element 10 of the first embodiment of the present invention. This results in the fuse element 10 being cut quickly at a time of an abnormality. As such, the current path of the circuit board can be broken at an early stage.

REFERENCE SIGNS LIST

10, 20, 30 Fuse element
11, 21, 31 Low-melting-point metal layer
12, 22, 32 High-melting-point metal layer
13, 23, 33 Intermediate layer
40 Fuse device
41 Insulating substrate
41*a* Surface
41*b* Rear face
42 First electrode
42*a* First external connection electrode
43 Second electrode
43*a* Second external connection electrode
44 Electrode protection layer
45 Connecting material
46 Flux
50 Cover member
60 Protection device
61 Insulating substrate
61*a* Surface
61*b* Rear face
62 First electrode
62*a* First external connection electrode
63 Second electrode
63*a* Second external connection electrode
64 First heating-body electrode
64*a* Heating-body power supply electrode
65 Second heating-body electrode
66 Heating-body extraction electrode
67 Electrode protection layer
68 Connecting material
69 Flux
70 Heating body
71 Insulating member
80 Cover member

The invention claimed is:

1. A fuse element, comprising:

a low-melting-point metal layer;

a high-melting-point metal layer provided over at least one surface of the low-melting-point metal layer; and an intermediate layer disposed between the low-melting-point metal layer and the high-melting-point metal layer, wherein the intermediate layer is directly in contact with both the high-melting point metal layer and the low-melting point metal layer, each of the high-melting-point metal layer and the intermediate layer is made of a metal that is liquefied by contacting a molten form of the low-melting-point metal layer, the high-melting point metal layer is made of silver or an alloy comprising silver as a main component thereof, a melting point of a material constituting the intermediate layer is higher than a melting point of a material constituting the low-melting-point metal layer and lower than a melting point of a material constituting the high-melting-point metal layer, and the intermediate layer is made of zinc or an alloy comprising zinc as a main component thereof.

2. The fuse element of claim 1, wherein the melting point of the material constituting the low-melting-point metal layer is in a range of 138° C. or higher and 250° C. or lower, the melting point of the material constituting the high-melting-point metal layer is higher by 100° C. or more than the melting point of the material constituting the low-melting-point metal layer, and the melting point of the material constituting the intermediate layer is higher by 30° C. or more than the melting point of the material constituting the low-melting-point metal layer and lower by 30° C. or more than the melting point of the material constituting the high-melting-point metal layer.

3. The fuse element of claim 1, wherein the melting point of the material constituting the low-melting-point metal layer is a liquidus temperature of the material constituting the low-melting-point metal layer, the melting point of the material constituting the high-melting-point metal layer is a liquidus temperature of the material constituting the high-melting-point metal layer, and the melting point of the material constituting the intermediate layer is a liquidus temperature of the material constituting the intermediate layer.

4. The fuse element of claim 1, wherein a ratio between a film thickness of the intermediate layer and a film thickness of the high-melting-point metal layer is in a range of 10:1 to 1:30, and a ratio between a total film thickness of the high-melting-point metal layer and the intermediate layer and a film thickness of the low-melting-point metal layer is in a range of 1:2 to 1:100.

5. The fuse element of claim 1, wherein a film thickness of the low-melting-point metal layer is 30 μm or more, a film thickness of the high-melting-point metal layer is in a range of 1 μm or more and 200 μm or less, and a film thickness of the intermediate layer is in a range of 0.1 μm or more and 50 μm or less.

6. The fuse element of claim 1, wherein the low-melting-point metal layer is made of tin or an alloy comprising tin as a main component thereof.

7. A fuse device comprising:

an insulating substrate; and the fuse element of claim 1 disposed on a surface of the insulating substrate.

8. A protection device comprising:

an insulating substrate;

the fuse element of claim 1 disposed on a surface of the insulating substrate; and a heating body disposed on a surface of the insulating substrate to heat the fuse element.

9. The fuse element of claim 2, wherein the melting point of the material constituting the low-melting-point metal layer is a liquidus temperature of the material constituting the low-melting-point metal layer, the melting point of the material constituting the high-melting-point metal layer is a liquidus temperature of the material constituting the high-melting-point metal layer, and the melting point of the material constituting the intermediate layer is a liquidus temperature of the material constituting the intermediate layer.

10. The fuse element of claim 2, wherein a ratio between a film thickness of the intermediate layer and a film thickness of the high-melting-point metal layer is in a range of 10:1 to 1:30, and a ratio between a total film thickness of the high-melting-point metal layer and the intermediate layer and a film thickness of the low-melting-point metal layer is in a range of 1:2 to 1:100.

11. The fuse element of claim 2, wherein a film thickness of the low-melting-point metal layer is 30 μm or more, a film thickness of the high-melting-point metal layer is in a range of 1 μm or more and 200 μm or less, and a film thickness of the intermediate layer is in a range of 0.1 μm or more and 50 μm or less.

12. The fuse element of claim 2, wherein the low-melting-point metal layer is made of tin or an alloy comprising tin as a main component thereof.

13. The fuse element of claim 9, wherein a ratio between a film thickness of the intermediate layer and a film thickness of the high-melting-point metal layer is in a range of 10:1 to 1:30, and a ratio between a total film thickness of the high-melting-point metal layer and the intermediate layer and a film thickness of the low-melting-point metal layer is in a range of 1:2 to 1:100.

14. The fuse element of claim 13, wherein a film thickness of the low-melting-point metal layer is 30 μm or more, a film thickness of the high-melting-point metal layer is in a range of 1 μm or more and 200 μm or less, and a film thickness of the intermediate layer is in a range of 0.1 μm or more and 50 μm or less.

15. The fuse element of claim 14, wherein the low-melting-point metal layer is made of tin or an alloy comprising tin as a main component thereof.

* * * * *